United States Patent
Ikeda

(10) Patent No.: US 9,652,857 B2
(45) Date of Patent: May 16, 2017

(54) OBJECT DETECTION APPARATUS DETECTION METHOD AND PROGRAM

(75) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/130,093

(22) PCT Filed: Jun. 29, 2012

(86) PCT No.: PCT/JP2012/067251
§ 371 (c)(1),
(2), (4) Date: Dec. 30, 2013

(87) PCT Pub. No.: WO2013/005815
PCT Pub. Date: Jan. 10, 2013

(65) Prior Publication Data
US 2014/0140576 A1 May 22, 2014

(30) Foreign Application Priority Data
Jul. 1, 2011 (JP) ................ 2011-147289

(51) Int. Cl.
*G06T 7/136* (2017.01)
*G06K 9/00* (2006.01)
*G06T 7/50* (2017.01)

(52) U.S. Cl.
CPC .......... *G06T 7/136* (2017.01); *G06K 9/00771* (2013.01); *G06T 7/50* (2017.01)

(58) Field of Classification Search
None
See application file for complete search history.

(56) References Cited

U.S. PATENT DOCUMENTS

| 2003/0065256 A1 | 4/2003 | Rubinstenn | |
| 2012/0020523 A1* | 1/2012 | Ikeda | G01B 11/005 382/103 |

FOREIGN PATENT DOCUMENTS

| CN | 102369549 A | 3/2012 |
| EP | 1297781 A1 | 4/2003 |
| EP | 2405393 A1 | 1/2012 |
| JP | 2000-090283 A | 3/2000 |

(Continued)

OTHER PUBLICATIONS

Mittal, A., Larry, S.D. 2002. M2Tracker: A Multi-View Approach to Segmenting and Tracking People in a Cluttered Scene. IJCV, 2002.*

(Continued)

*Primary Examiner* — Siamak Harandi
*Assistant Examiner* — Kate R Duffy
(74) *Attorney, Agent, or Firm* — Wilmer Cutler Pickering Hale and Dorr LLP

(57) ABSTRACT

An object detection apparatus acquires the value of an overlapping area which indicates a high probability that an object is located within a three dimensional space using data including a back projection of an object area on a three-dimensional space, acquires the integral quantity of the value of the overlapping area in a shape model including a three-dimensional target, and acquires the distribution degree of the value of the overlapping area in the shape model of the detection target. The apparatus further determines whether the inside of the shape model is an object or non-object using the integral quantity and the distribution degree.

17 Claims, 12 Drawing Sheets

(56) References Cited

FOREIGN PATENT DOCUMENTS

| JP | 2004-000428 A | 1/2004 |
|---|---|---|
| JP | 2008-015573 A | 1/2008 |
| JP | 2008-310724 A | 12/2008 |
| WO | WO-2010/101227 A1 | 9/2010 |

OTHER PUBLICATIONS

Khan, et al. "Consistent Labeling of Tracked Objects in Multiple Cameras with Overlapping Fields of View." IEEE Transactions on Pattern Analysis and Machine Intelligence. 25.10 (2003): 1355-1360. Print.*

Khan, et al. "A Multiview Approach to Tracking People in Crowded Scenes Using a Planar Homography Constraint." Lecture Notes in Computer Science, ECCV. 3954. (2006): 133-146. Print.*

International Search Report corresponding to International Application No. PCT/JP2012/067251, Jul. 20, 2012, 5 pages.

\* cited by examiner

OBJECT DETECTION APPARATUS DETECTION METHOD AND PROGRAM

CROSS-REFERENCE TO RELATED APPLICATIONS

This application is a national stage application of International Application No. PCT/JP2012/067251 entitled "OBJECT DETECTION DEVICE, OBJECT DETECTION METHOD, AND PROGRAM," filed on Jun. 29, 2012, which claims the benefit of the priority of Japanese patent application JP2011-147289, filed on Jul. 1, 2011, the disclosures of each of which are hereby incorporated by reference in their entirety.

TECHNICAL FIELD

The present invention relates to an object detection apparatus, an object detection method and a program which perform a position estimation and detection of an object in a three-dimensional space using a back projection of the object obtained from a plurality of camera images.

BACKGROUND ART

The object detection apparatus is used in order to perform a position estimation and detection of an object in a three-dimensional space using a plurality of camera images. An example of the such object detection apparatus is disclosed in the patent document 1.

The image processing apparatus disclosed in the patent document 1 is an apparatus which performs a position estimation and detection of an object in a three-dimensional space using a plurality of camera images. The technology of the patent document 1 arranges a plurality of cameras so that a part of a sight of the camera may be overlapped and extracts a moving area from the camera image of the each camera, first. Next, assuming that the relation between the each camera image and the three-dimensional space is calibrated, the technology of the patent document 1 performs the back projection of a moving area extracted with each camera in a plurality of planes designated whose height in the three-dimensional space is different. And the technology of the patent document 1 detects the overlapping in the moving area on the plane to which the back projection has been performed, judges (or integrates) an existence overlapped in a moving area in a plurality of planes in the same spot and performs the position estimation and detection of the object in the three-dimensional space.

CITATION LIST

Patent document 1: Japanese Unexamined Patent Application Laid-Open No. 2008-015573

SUMMARY OF INVENTION

Technical Problem

It is the problem in the technology described in the patent document 1 that the object in the three-dimensional space may not be detected when a lack or the like takes place in the moving area extracted from the camera image (when a good quality moving area cannot be extracted).

The reason is that the integral quantity of the overlapping of the moving area in the plurality of planes in the same spot decreases by the lack or the like in the area and it becomes difficult to distinguish from the overlap which takes place by the noise such as the shadow.

FIG. 1 is a figure which shows the problem by a lack in a moving area extracted from a camera image. As shown in FIG. 1, the integral quantity in the shape model in the object position is large concerning to a person A. On the other hand, concerning to a person B, the integral quantity in the shape model in the object position is not so large and the integral quantity becomes to the same level as the noise such as the shadow by the influence of the lack in the moving area (the lack in the moving area relating to a lack of the view volume). Therefore, it becomes difficult to distinguish the person B from the noise.

For this reason, it is the object of the present invention in the object detection on the three-dimensional space using a back projection of an object area extracted from a plurality of camera images to provide an object detection apparatus, an object detection method and a program which reduce by the influence of the precision decline (such as the lack of an object area) of the object area extracted from a camera image.

Solution to Problem

An object detection apparatus of the present invention includes:

an overlapping area acquisition unit which acquires a value of an overlapping area which indicates a high possibility of an object existence in a three-dimensional space, using data generated by images acquired by a plurality of image acquiring units, which reflects the object image in three-dimensional space by a back projection of the object area;

an overlapping quantity acquisition unit which acquires an integral quantity of the value of the overlapping area in a shape model which is a three-dimensional model concerning to a shape of the object as a detection target;

an overlapping distribution acquisition unit which acquires a distribution degree of the value of the overlapping area in the shape model of the detection target;

and an object determination unit which determines whether an internal of the shape model of the detection target is an object or non-object using the integral quantity and the distribution degree.

An object detection method of the present invention comprising: acquiring the value of the overlapping area which indicates that a possibility of the object on the three-dimensional space is high using the data to which has been performed a back projection of an object area which has been generated by an image which a plurality of image acquiring units have acquired on a three-dimensional space, by an overlapping area acquisition means;

acquiring the integral quantity of the value of the overlapping area in the shape model which is a three-dimensional model concerning to the shape of the object of the detection target, by overlapping quantity acquisition means;

acquiring the distribution degree of the value of the overlapping area in the shape model of the detection target by overlapping distribution acquisition means and determinating whether the internal of the shape model of a detection target is an object or non-object using the integral quantity and the distribution degree, by an object determination means.

A non-transitory computer readable media storing a computer program causing a computer to execute in the present invention:

an acquiring step of acquiring a value of an overlapping area which indicates a high possibility of an object existence in a three-dimensional space, using data generated by images acquired by a plurality of image acquiring means, which reflects the object image in three-dimensional space by a back projection of the object area;

an overlapping quantity acquisition step of acquiring an integral quantity of the value of the overlapping area in a shape model which is a three-dimensional model concerning to a shape of the object as a detection target, an overlapping distribution acquisition step of acquiring a distribution degree of the value of the overlapping area in the shape model of the detection target and an object determining step of determining whether an internal of the shape model of the detection target is an object or non-object using the integral quantity and the distribution degree.

Advantageous Effects of Invention

According to the present invention, the influence caused by the precision decline of the object area (such as the lack of the object area) extracted from the camera image can be reduced and the object on the three-dimensional space can be detected robustly.

DESCRIPTION OF EMBODIMENTS

Hereinafter, the embodiments of the present invention will be described using the drawings. In all drawings, the same code is assigned to a similar component and its description is omitted appropriately.

Further, each part of the apparatus which composes the each exemplary embodiments, includes a controller, a memory, a program loaded in the memory, a storage unit such as a hard disk which stores the program and an interface for network connection. These parts are realized by an optional combination of the hardware and the software. As far as there is no special explanation, the realization method and apparatus are not limited.

The controller includes a CPU (Central Processing Unit) or the like, operates an operating system, controls the whole apparatus and reads a program and data from a recording medium loaded on a drive apparatus, for example, in the memory, and carries out the various processing according to the program and the data.

The recording media are an optical disc, a flexible disc, a magnetic optical disc, an external hard disk and a semiconductor memory or the like, for example, and records the computer program is recorded in a computer readable manner. The computer program may be downloaded from an external computer which is not shown connected to a communication network.

The block diagram used in the description of each exemplary embodiment indicates the blocks of the function unit, not the composition of the hardware units. In these figures, the realization means is not limited to them, although the composition units of the each exemplary embodiment may be described so as to be realized by one apparatus which is combined physically. That is, a system corresponding to the each exemplary embodiment with a plurality of these apparatus by connecting two or more apparatus which are separated physically with wire or wireless can be also realized.

First Exemplary Embodiment

First, the configuration of the object detection apparatus 100 according to as a first exemplary embodiment of the present invention will be described using FIG. 2.

Figure 1:
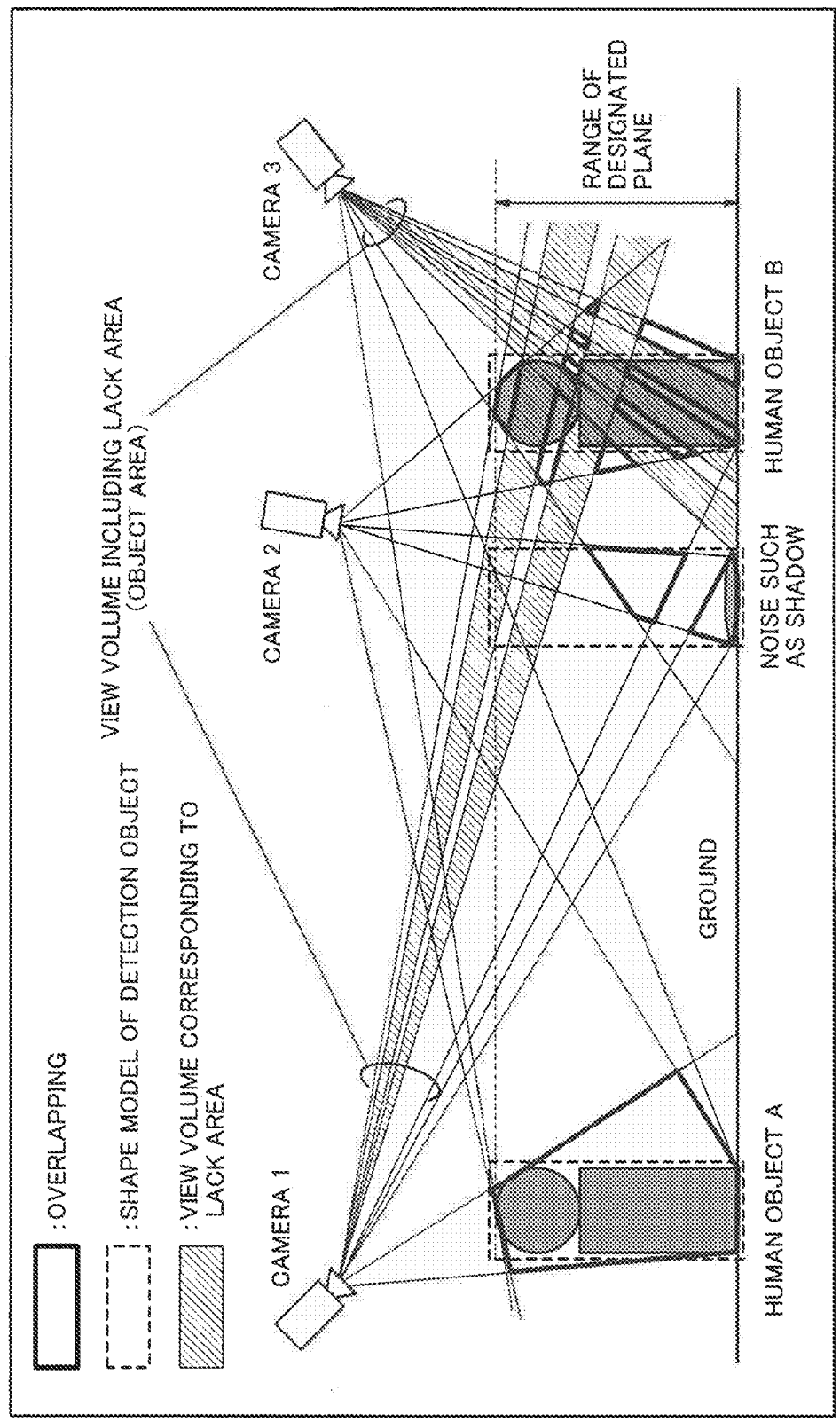
FIG. 1 is a figure which shows a problem caused by a lack in a moving area extracted from a camera image.
Figure 2:
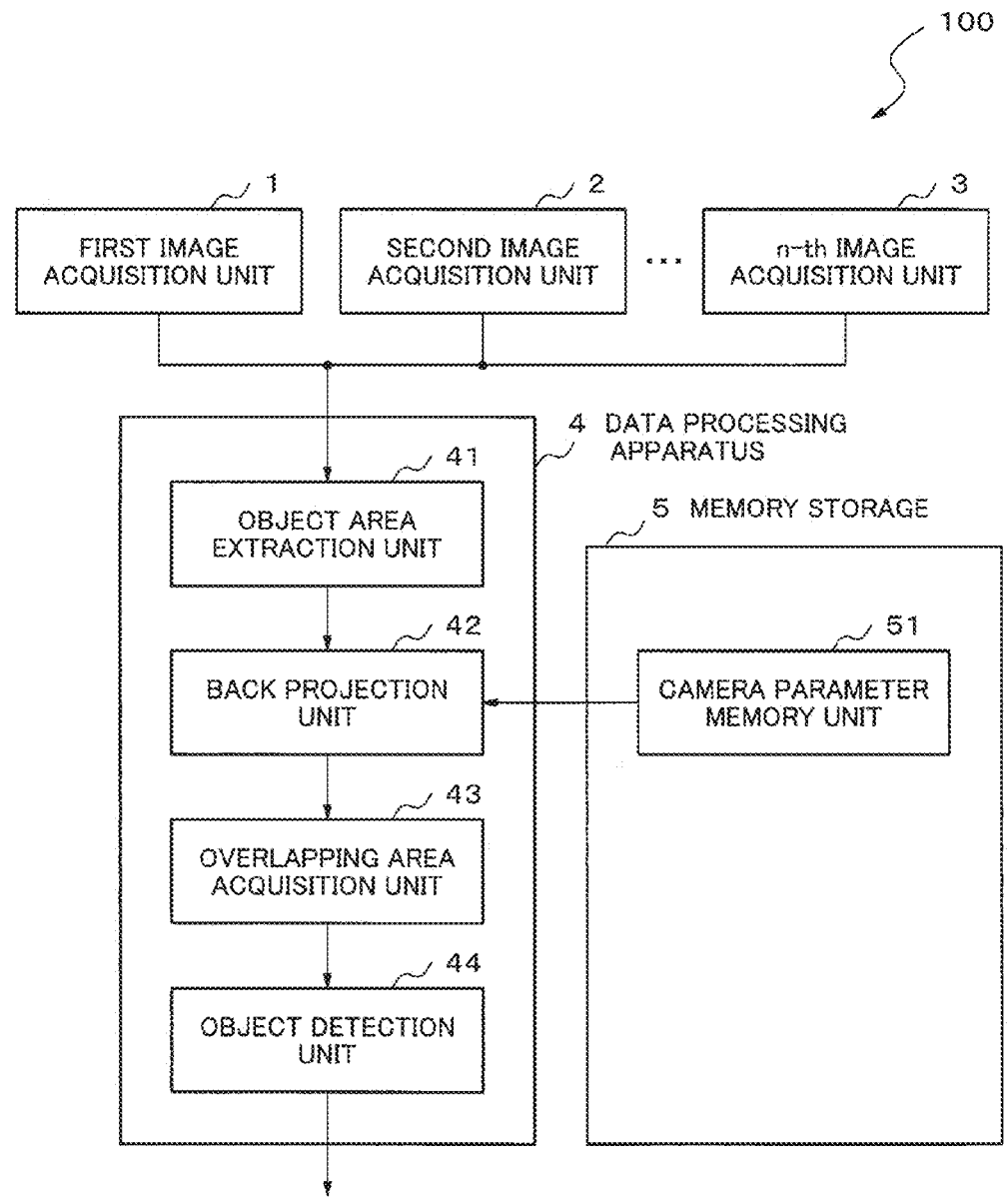
FIG. 2 is a block diagram which shows the composition of an object detection apparatus 100 according to a first exemplary embodiment of the present invention.

FIG. 2 is a block diagram which shows the composition of the object detection apparatus 100 according to the first exemplary embodiment of the present invention. Referring to FIG. 2, the object detection apparatus 100 according to the first exemplary embodiment of the present invention includes the first image acquiring unit 1 that acquires an image from a motion picture such as a camera, the second image acquiring unit 2 to n-th image acquiring unit 3, that is, n pieces of the acquiring units in total, a Data processing apparatus 4 which operates by the program control and a memory storage 5 which stores the information.

The memory storage 5 includes a camera parameter memory unit 51. The camera parameter memory unit 51 stores a camera parameter (the parameter which converts a two dimensional coordinate of the acquired image from the image acquiring unit to a three-dimensional coordinate of the three-dimensional space (such as the internal/external cameral parameters and the distortion coefficient), the three-dimensional position of the image acquiring unit and the direction of the image acquiring unit) that corresponds to each image acquiring unit. The camera parameter is acquired by correlating the three-dimensional coordinate with the two dimensional coordinate. The two dimensional coordinate and the three-dimensional coordinate can be converted to each other mutually by using the camera parameter corresponding to the image acquiring unit.

The Data processing apparatus 4 includes an object area extraction unit 41, a back projection unit 42, an overlapping area acquisition unit 43 and an object detection unit 44.

The object area extraction unit 41 acquires the image synchronized in the first image acquiring unit 1 to the n-th image acquiring unit 3. The object area extraction unit 41 extracts the object area and generates an object area image for each image performing image processing by such as background difference method, inter-frame difference method or object detection method using the posterior probability to each acquired image. The object area image is an image which labelled with a value distinguished according to whether the area is correspond to the object or not. For example, it is a binary code image in which the pixel of the object area is one while the other than it is zero. Further, the method in which the object area extraction unit 41 extracts the object area image is not limited to the method mentioned above and may be any method as far as the object area image can be extracted.

The object area extraction unit 41 outputs a plurality of generated object area images to the back projection unit 42.

The back projection unit 42 performs the back projection of the object area in the object area image outputted from the object area extraction unit 41 on the three-dimensional space using a camera parameter stored in the camera parameter memory unit 51. The back projection unit 42 performs the back projection processing to a plurality of the all object area images corresponding to each image acquiring unit. The back projection unit 42 outputs the data in which an object area is projected in a back projection manner on the three-dimensional space to an overlapping area acquisition unit 43.

The overlapping area acquisition unit 43 acquires a overlapping area in the three-dimensional space from the data of the back projection (the view volume) of the object area obtained by the back projection unit 42 corresponding to the each image acquiring unit. The overlapping area is the area which shows that the possibility that the space on the three-dimensional space is an object is high, and the area that is expressed by adding the score (the value) to the prescriptive space (such as a voxel). Further, the both setting that the possibility that the space is an object becomes higher, when the score becomes higher and that the possibility that the space is an object becomes higher when the score becomes lower are possible. It is supposed for convenience of the description after, that the possibility that it is an object becomes higher when the score becomes higher.

For example, the overlapping area acquisition unit 43 can determines the score of the back projection of the image acquiring units which obtain sight, value one or zero, and acquires the total score from the AND of the value. There is a view volume crossover method as an example of this acquisition method. In addition, the overlapping area acquisition unit 43 may make the number of the image acquiring units (the number of back projections) from which the back projection has been obtained, the score to the prescriptive space.

Furthermore, there is a method to make the value obtained by normalizing the number (hereinafter, referred to as "the number of back projections") of the image acquiring units from which the back projection has been obtained with the number of the image acquiring units from which the sight is obtained (hereinafter, referred to as "the number of the sight"), the score to the prescriptive space. In addition, there is a method to set the score obtained by the above to the binary value by the predetermined threshold value and make it the score. The detail is described later concerning to the score calculation so that the overlapping area acquisition unit 43 can acquire the overlapping area.

The overlapping area acquisition unit 43 outputs the three-dimensional space data to which the score that indicates those are of an overlapping area has been added to the object detection unit 44.

The object detection unit 44 detects the object in the three-dimensional space using the three-dimensional space data outputted from the area acquisition unit 43, to which the score (the score in the three-dimensional space) that indicates those three-dimensional space data are of an overlapping area and a three-dimensional shape model of the detection target. A three-dimensional shape model of the detection target is the three-dimensional model concerning to the shape of the object of a detection target. For example, when making a pedestrian the detection target, a cylindrical shape is considered as a three-dimensional shape model, in consideration of the size or the like of the statistical general person. The three-dimensional shape model may be set to the object detection unit 44 in advance. Otherwise, the three-dimensional shape model may be stored in a memory unit and an external apparatus which are not illustrated in advance, and the three-dimensional shape model may be inputted from the memory unit and the external apparatus to the object detection unit 44. In terms with the composition of the object detection unit 44, the detail is described later. Further, hereinafter, a three-dimensional shape model is called just as a shape model.

Figure 3:
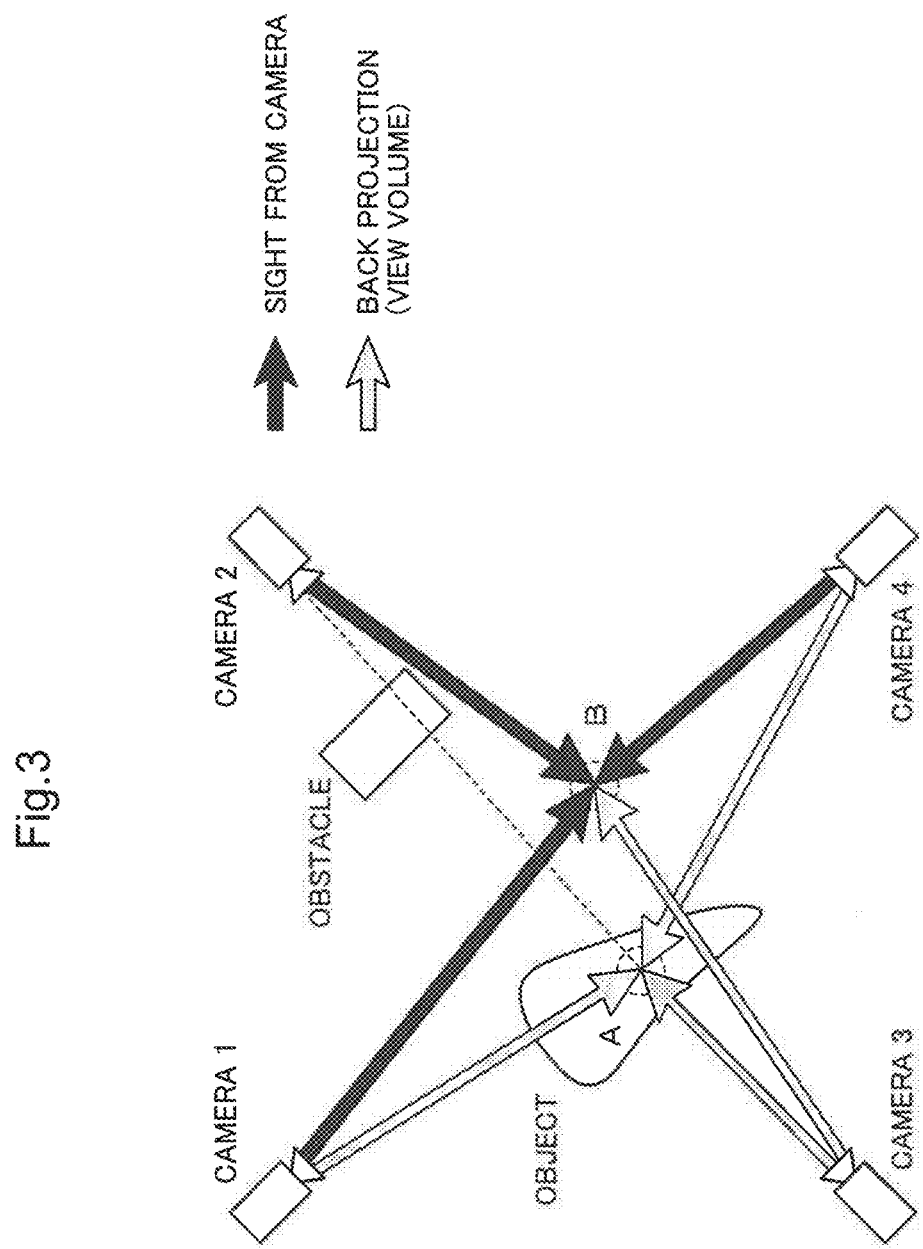
FIG. 3 is a figure which illustrates a score calculation method by sector of the acquisition scheme concerning to an overlapping area in the first exemplary embodiment of the present invention.

Next, a score counting method in detail for acquiring the overlapping area with the overlapping area acquisition unit 43 is described with reference to FIG. 3. FIG. 3 is a figure which illustrates the score calculation way of each acquisition method about a overlapping area in the first exemplary embodiment of the present invention. As described later, there are various methods in terms with a method to acquire the overlapping area by the overlapping area acquisition unit 43.

First, an assumption under which the FIG. 3 is drawn will be described. FIG. 3 indicates the situation which includes total of four cameras of cameras 1-4, one object and one obstacle. The spot A exists inside the object. Cameras 1, 3 and 4 are image acquiring units from which the sight is obtained in spot A. Cameras 1, 3 and 4 are image acquiring units from which a back projection of an object is obtained at the same time. The camera 2 is neither an image acquiring unit from which the sight is obtained in spot A by influence of an obstacle nor an image acquiring unit which can obtain a back projection of an object.

FIG. 3 shows that cameras 1-4 are the image acquiring units which can obtain the sight in other spots (spot B) around the spot A. The camera 3 is image acquiring unit which can obtain a back projection, because the camera 3 pick up an object in the sight to the spot B.

In summarizing the above, the number of the sight is 3 and the number of back projections is 3 in spot A while the number of the sight is 4 and the number of back projections is 1 in spot B.

Next, three examples in detail of the point counting specific by acquisition method will be described with reference to FIG. 3.

(A) A Point Counting Method Using AND Value.

The image acquiring units from which the sight is obtained are three cameras 1, 3 and 4 in spot A. All cameras can get a back projection.

Accordingly, the score of the spot A is obtained by calculating the AND value, such as 1 AND 1 AND 1=1.

The image acquiring units from which the sight is obtained are four cameras 1 to 4 in spot B. A camera which can get a back projection, out of those four cameras, is only the camera 3.

Accordingly, the score of the spot B is obtained by the calculation of AND value, such as 0 AND 0 AND 1 AND 0=0.

(B) A Method of Point Counting Using the Number of Back Projections as the Score Because the number of back projections is 3, the score of the spot A is 3. Because the number of back projections is 1, the score of the spot B is 1.

(C) A Method of Point Counting Using the Normalized Number of Back Projections

The number of the sight is 3 in spot A, and the number of back projections is also 3. Therefore, the score of the spot A is obtained by normalizing the number of back projections by the number of the sight. Then the score 3/3=1 is obtained.

In spot B, the number of the sight is 4 and the number of back projections is 1. Therefore, the score of the spot B is obtained by normalizing the number of back projections by the number of the sight, and ¼=0.25 is obtained.

Although it has been described in detail using FIG. 3 above, the score counting method for acquiring the overlapping area by the overlapping area acquisition unit 43 is not limited to the mentioned above, and any counting method may be applicable if the overlapping area can be acquired reasonably.

Figure 4:
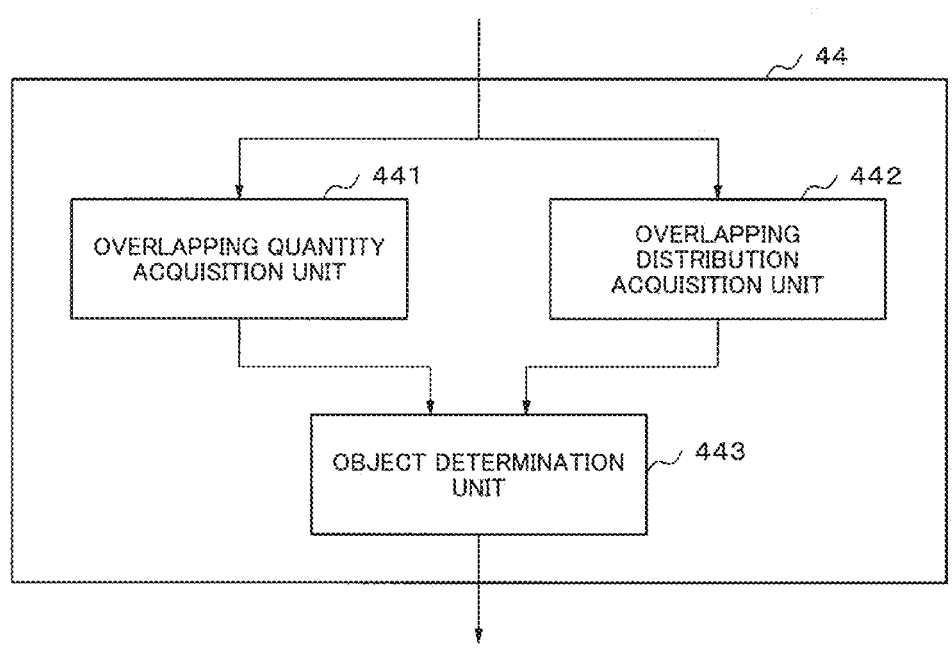
FIG. 4 is a block diagram which shows the detailed composition of an object detection unit 44.

Next, the details of the composition of the object detection unit 44 will be described with reference to FIG. 4 and FIG. 5. FIG. 4 is a block diagram which shows the detailed configuration of the object detection unit 44. Referring to FIG. 4, the object detection unit 44 includes the overlapping quantity acquisition unit 441, the overlapping distribution acquisition unit 442 and an object determination unit 443.

The overlapping quantity acquisition unit 441 acquires three-dimensional space data to which the score (the score in the three-dimensional space) that indicates the overlapping area has been given from the overlapping area acquisition unit 43. The overlapping quantity acquisition unit 441 sets the shape model of the detection target to the position to perform the object detection for on the three-dimensional space data, and acquires the integral quantity of the overlapping area (the score in the three-dimensional space) in the model. The embodied formula for acquiring the integral quantity by the overlapping quantity acquisition unit 441 is indicated in the formula (1).

$$S = \Sigma_{x,y,z \in M} v(x,y,z) \quad \text{Formula (1)}$$

S is the integral quantity of the overlapping area to the shape model. v (x, y, z) is the score concerning to the overlapping area in the three-dimensional space (x, y, z). And M is the shape model of the detection target.

The overlapping quantity acquisition unit 441 outputs the three-dimensional space data and the integral quantity of the overlapping area to an object determination unit 443.

The overlapping distribution acquisition unit 442 sets the shape model of the detection target to the position to perform the object detection for on the three-dimensional space data, and acquires the integral quantity of the overlapping area (the score in the three-dimensional space) in the model. The overlapping distribution acquisition unit 442 sets the shape model of the detection target to the position to perform the object detection for on the three-dimensional space data, and acquires the distribution degree of the overlapping area (the score in the three-dimensional space) in the model. The distribution degree is an index which digitizes the distribution state which shows whether the overlapping area is distributed uniformly or unevenly in the shape model.

The concrete calculation method of the distribution degree by the overlapping distribution acquisition unit 442 is described. First, the overlapping distribution acquisition unit 442 divides the shape model into two or more spaces (partial space). The overlapping distribution acquisition unit 442 may divide the shape model into two or more equal partial spaces. Next, the overlapping distribution acquisition unit 442 calculates the integral quantity of the overlapping area to each partial space i as shown in the formula (2) and normalizes by the integral quantity S of the overlapping area in the whole shape model.

$$S'_i = \frac{1}{S} \sum_{x,y,z \in M_i} v(x, y, z) \quad \text{Formula (2)}$$

"S'i" is the normalized value of integration of the overlapping area to each partial space i. "v (x, y, z)" is the score concerning to the overlapping area in the three-dimensional space (x, y, z). Mi is each partial space.

Next, the overlapping distribution acquisition unit 442 calculates the average and the dispersion as shown in the formula (3) and the formula (4) to the normalized value S'i in the partial space i which is calculated by the formula (2), and acquires the dispersion of the formula (4) as the distribution degree. The smaller distribution degree value shows the smeller the distribution in the partial space. And the small distribution degree value means a uniform distribution of the overlapping area. Conversely, the higher distribution degree shows that the overlapping area is distributed uniformly.

$$S'_m = \frac{\sum_{i=1}^{n} S'_i}{n} = \frac{1}{S}\frac{S}{n} = \frac{1}{n} \quad \text{Formula (3)}$$

"S'm" is an average value of normalized S'i in a partial spaces i. "n" is the number of the partial spaces.

$$\sigma^2 = \frac{\sum_{i=1}^{n} (S_i - S'_m)^2}{n} \quad \text{Formula (4)}$$

Here, σ2 is the distribution degree.

In addition, the next method is considered as a calculation method of the distribution degree. For example, the overlapping distribution acquisition unit 442 divides the shape model into the upper and lower spaces (partial spaces) to the height direction and calculates the integral quantity of the overlapping area of the lower unit of the shape model. The overlapping distribution acquisition unit 442 converts the value into the ratio to the integral quantity S of the overlapping area in the whole shape model, and calculates the distribution degree after subtracting 0.5 using the absolute value. At that time when the distribution degree approaching to 0, the variation shows that the overlapping area is distributed uniformly, and conversely, when the distribution degree approaching to 0.5, the variation shows that the overlapping area is unevenly distributed.

Although the above is an example of the calculation method of the distribution degree, the distribution degree may be calculated by the other method than the above if the overlapping distribution acquisition unit 442 can calculate the degree which shows whether the overlapping area in the shape model is distributed uniformly in the shape model or it is unevenly distributed. When an image acquisition means (such as a camera) takes a picture from the upper part of the detection target like a general security camera, the back projection tends to spread greatly towards the bottom, and the overlapping area caused by the noise or the like often exists together in the bottom. Therefore, since the distribution degree of the height direction is important in this case, a partial space of the shape model may be set with dividing into the height direction equally in order to distinguish the overlapping area of the object and the overlapping area caused by noise with high accuracy.

The object determination unit 443 determines whether the internal of the shape model set in the position on the three-dimensional space to perform the object detection is an object or non-object using the relation between the integral quantity of the overlapping area which the overlapping quantity acquisition unit 441 has acquired and the distribution degree of the overlapping area which the overlapping distribution acquisition unit 442 has acquired.

Further, in FIG. 4, although an example composed of the overlapping quantity acquisition unit 441 and the overlapping distribution acquisition unit 442 in parallel has been indicated, it may be constituted in series. Specifically, the overlapping quantity acquisition unit 441 may output the integral quantity S of the acquired overlapping area to the distribution acquisition unit 442. When the integral quantity S'i in the overlapping area to each partial space i is calculated as shown in the formula (2), the overlapping distribution acquisition unit 442 may be calculated using S outputted from the overlapping quantity acquisition unit 441 without calculating S originally.

Figure 5:
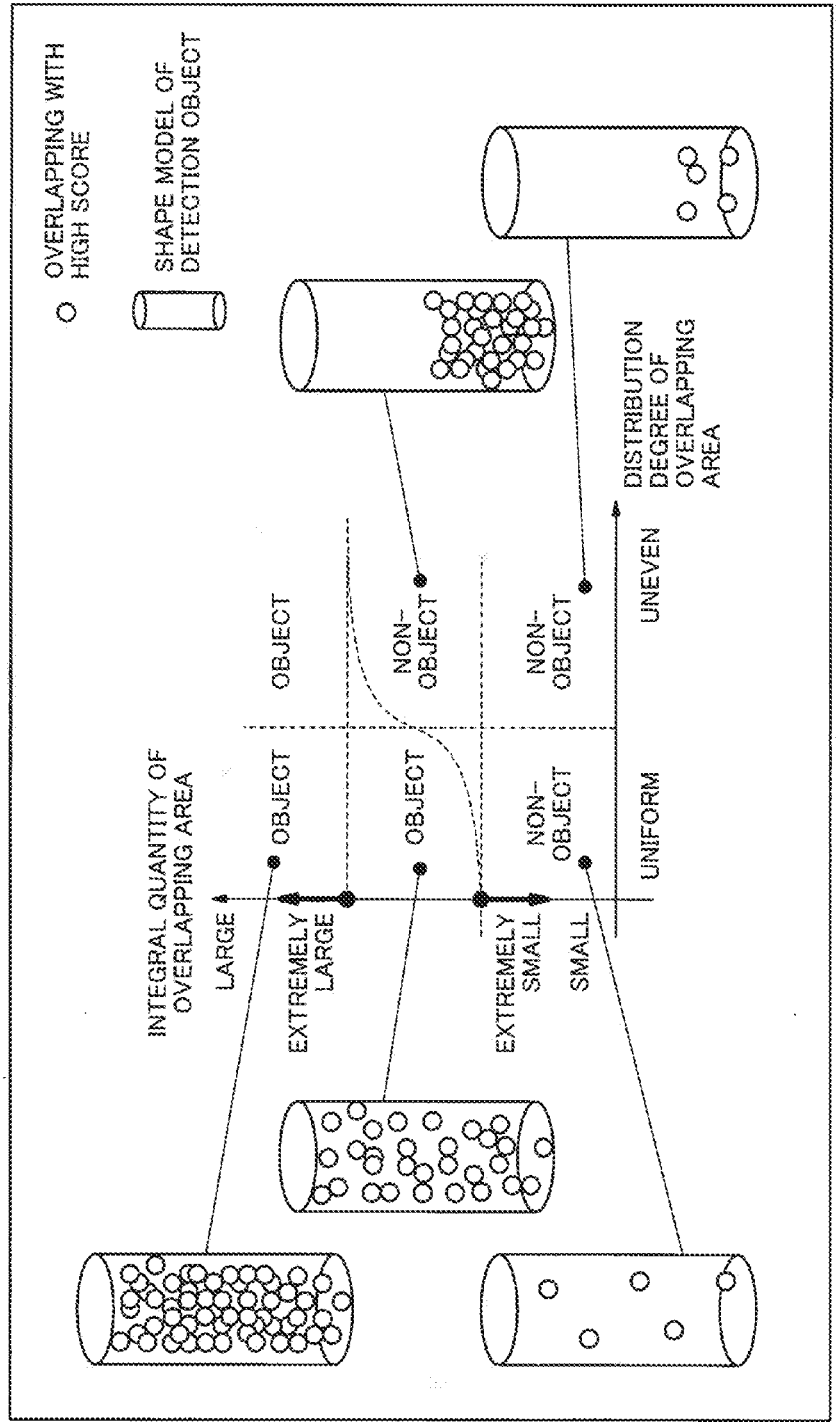
FIG. 5 is a figure which illustrates the relation between the required integral quantity of the overlapping area and the distribution degree in order to perform the object determination of the shape model in the first exemplary embodiment of the present invention.

FIG. 5 is a figure which illustrates the relation between the required integral quantity of the overlapping area and the distribution degree in order to perform the object determination of the shape model in the first exemplary embodiment of the present invention. In a central graph in FIG. 5, the vertical axis represents the integral quantity of the overlapping area while the horizontal axis represents the distribution degree of the overlapping area. As shown in FIG. 5, when the integral quantity (the population parameter of the overlapping area) of the overlapping area is extremely large or small, the determination of the object is ruled by the integral quantity of the overlapping area. On the other hand, when the integral quantity of the overlapping area has a certain volume, the determination of the object is ruled by the distribution degree of the overlapping area.

In addition, it has the property in general that a possibility of the object is high when the integral quantity is large and a possibility of the object is high when the distribution degree is uniform. Then object determination unit 443 determines whether the internal of the shape model is an object or non-object according to these properties.

The extremely large (small) value shown here is a sufficient value to determine whether it is an object (non-object) only by the integral quantity of the overlapping area shown in FIG. 5. The value may be found experimentally or may be calculated by learning from the data. When the internal of the shape model is the object of a detection target, the overlapping area is filled in the shape model basically. Therefore, the integral quantity of the overlapping area becomes large while the distribution degree of the overlapping area becomes uniform. Even if a lack or the like occurs in a part of the object area except a case that the lack or the like occurs widely, the integral quantity does not extremely become small or the distribution degree does not extremely become uneven. The present invention according to the first exemplary embodiment is using such property for determination of an object.

As a concrete determining method, for example, there is a method to determine that it is an object or non-object as follows at the following condition. When the integral quantity of the overlapping area is larger than the threshold value (the first threshold value) that indicates it is extremely large, the object determination unit 443 determines that the internal of the shape model is an object. When the integral quantity of the overlapping area is smaller than the threshold value (the second threshold value) that indicates it is extremely small, the object determination unit 443 determines that the internal of the shape model is non-object. In other cases, the object determination unit 443 determines that the internal of the shape model is an object when it is smaller (close to uniformity) than the threshold value (the third threshold value) that indicates that the distribution degree of the overlapping area is uniform. When the distribution degree of the overlapping area is larger (close to uneven) than the third threshold value, the object determination unit 443 determines that the internal of the shape model is non-object. Then object determination unit 443 may determine that the internal of the shape model is the object or non-object by the method mentioned above.

In addition, for example, there is a method to give the integral quantity of the overlapping area the weight by the distribution degree and determine that it is an object by the threshold value. Specifically, in cased that the integral quantity of the overlapping area is a certain large value, the object determination unit 443 gives a weight to the integral quantity according to the distribution degree of the overlapping area (gives an larger weight when the distribution degree is smaller, that is, close to uniform) may determine that the internal of the shape model is an object when the value of the integral quantity is no smaller than the threshold value. At that time, the object determination unit 443 may convert the obtained integral quantity into the likelihood which approaches one when the integral quantity is large and approaches to zero when the integral quantity is small, and output the integral quantity as the object likelihood.

For example, there is a method to convert the integral quantity of the overlapping area and the distribution degree into the object likelihood, by using the two dimension likelihood function, and determine that it is an object when being no smaller than the threshold value of the likelihood (it may be outputted as the object likelihood just as it is). The likelihood function used here may be the designed function so as to fill FIG. 5. Specifically, the likelihood function may be designed so as to fill the function described below. The value of the likelihood (a) approaches to 1 when the integral quantity is extremely large and approaches to 0 when the integral quantity is extremely small, (b) approaches to 1 when the integral quantity is large and the distribution degree is uniform and approaches to 0 when the integral quantity is small and the distribution degree is uneven in other case of the integral quantity, (c) approaches to 0.5 around the boundary of FIG. 5. The likelihood function having the properties of (a) to (c) may be obtained by learning.

In addition, there is a method to make the integral quantity of the overlapping area and the distribution degree likelihood by the likelihood function respectively, to integrate them by the sum with the weighted value shown in the formula (5) and to determine that it is an object when the value of the integrated object likelihood is not smaller than the threshold value (it may be outputted as object likelihood just as it is). Here, the likelihood function concerning to the integral quantity may be the function designed so that the likelihood value may approach to 1 when the integral quantity is large and may approach to 0 when it is small. The likelihood function concerning to the distribution degree may be the function designed so that the likelihood value may approach to 1 when the distribution degree get closer to the uniform distribution and may approach to 0 when the distribution degree get closer to the uneven distribution. The weight approaches to 1 and gives the weight for the object likelihood of the integral quantity in case that the integral quantity is extremely large or small while the weight approaches to 0 and gives the weight for the object likelihood of the distribution degree in other cases than that. In other words, the weight makes the object likelihood of the integral quantity dominant when the integral quantity is extremely large or small while it makes the object likelihood of the distribution degree dominant in other cases than that.

$$P = wP_1(S) + (1-w)P_2(\sigma^2) \quad \text{Formula (5)}$$

Here, P is the integrated object likelihood (the integrated likelihood function). P1 (S) is the function for making the integral quantity of the overlapping area likelihood (the first likelihood function). P2 (σ2) is the function for making the distribution degree of the overlapping area likelihood (the second likelihood function). w is the weight which is a value between 0 and 1.

The object detection unit 44 may set the shape model to the position on the three-dimensional space to perform the object detection. The object detection unit 44 may set the shape model to all positions on the space and may be set it to the position on the possible partial space. Further, because the position on the three-dimensional space of shape model has been found by the setting, the object position can be presumed simultaneously when the object detection unit 44 detects an object.

Next, the operation of an object detection apparatus 100 according to the first exemplary embodiment of the present invention will be described in detail with reference to FIG. 2, FIG. 4, FIG. 6 and FIG. 7.

Figure 6:
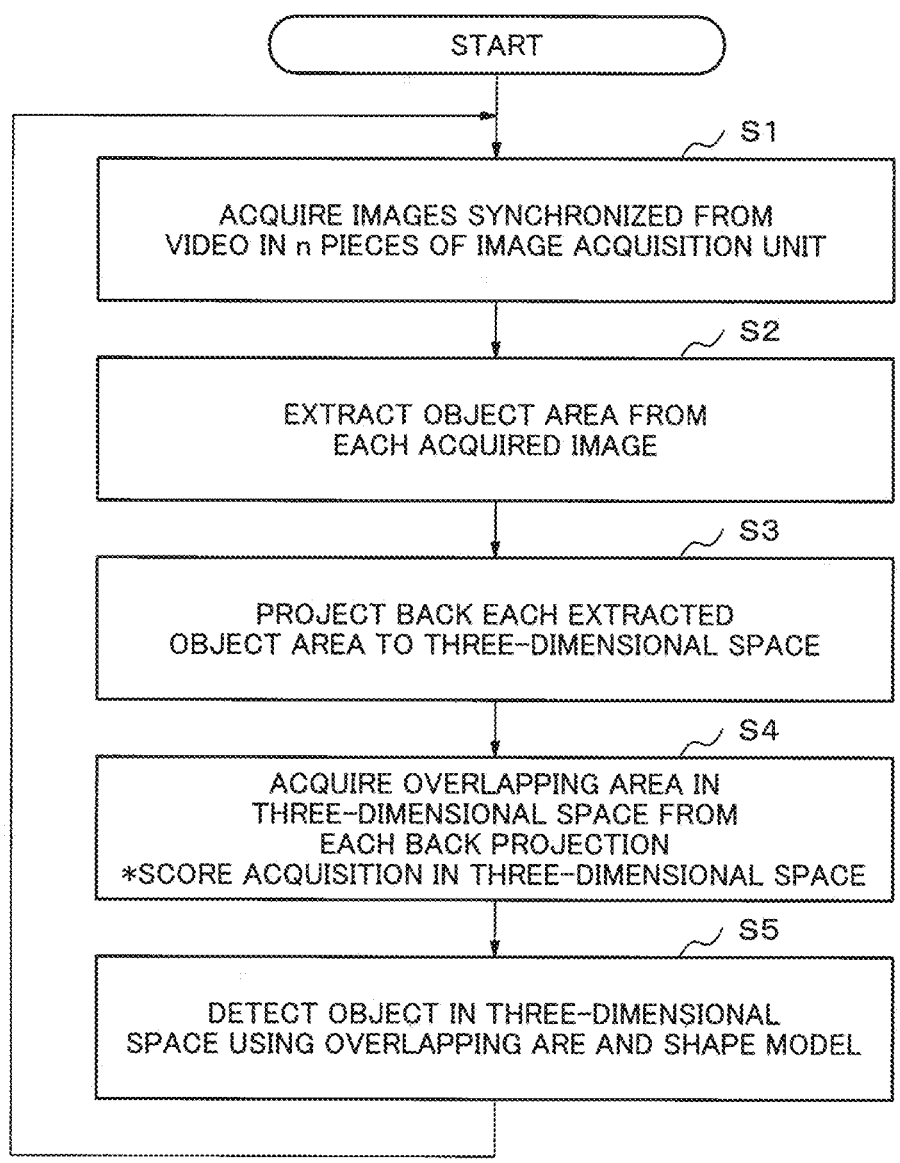
FIG. 6 is a flowchart diagram which shows an operation of an object detection apparatus 100 according to the first exemplary embodiment of the present invention.

FIG. 6 is a flowchart figure which shows the operation of the object detection apparatus 100 according to the first exemplary embodiment of the present invention. As shown in FIG. 6, the first image acquiring unit 1 to the n-th image acquiring unit 3 acquires the images from the motion pictures acquired by camera or the like, synchronize the images between such image acquiring units and output to the object area extraction unit 41. The object area extraction unit 41 acquires the image synchronized in n pieces of the image acquiring units (Step S1).

Next, the object area extraction unit 41 performs the image processing such as the background difference method to each synchronized image, extracts the object area and generates an object area image for each image (Step S2). The object area extraction unit 41 outputs a plurality of the generated object area images to the back projection unit 42.

The back projection unit 42 performs the back projection on the three-dimensional space for the object area corresponding to the object area image for the each image acquiring unit outputted from the object area extraction unit 41, by using a camera parameter stored in a camera parameter memory unit 51 (Step S3). The back projection unit 42 outputs the three-dimensional space data obtained from a plurality of back projection corresponding to each object area image to the overlapping area acquisition unit 43.

The overlapping area acquisition unit 43 acquires the overlapping area which indicates that the possibility that the space on the three-dimensional space is an object is high from the three-dimensional space data of a plurality of the back projections (the view volume) outputted from the back projection unit 42 by the manner that the score is given to the space (Step S4). The overlapping area acquisition unit 43 outputs the three-dimensional space data to which the score that indicates that it is the overlapping area is given to the object detection unit 44.

The object detection unit 44 detects an object in the three-dimensional space, by using the three-dimensional space data to which the score which indicates the space data is of the overlapping area that is outputted from the overlapping area acquisition unit 43 (the score in the three-dimensional space) is added and the shape model of the detection target (Step S5).

The object detection unit 44 outputs a detection result of the object on the three-dimensional space to the outside.

Figure 7:
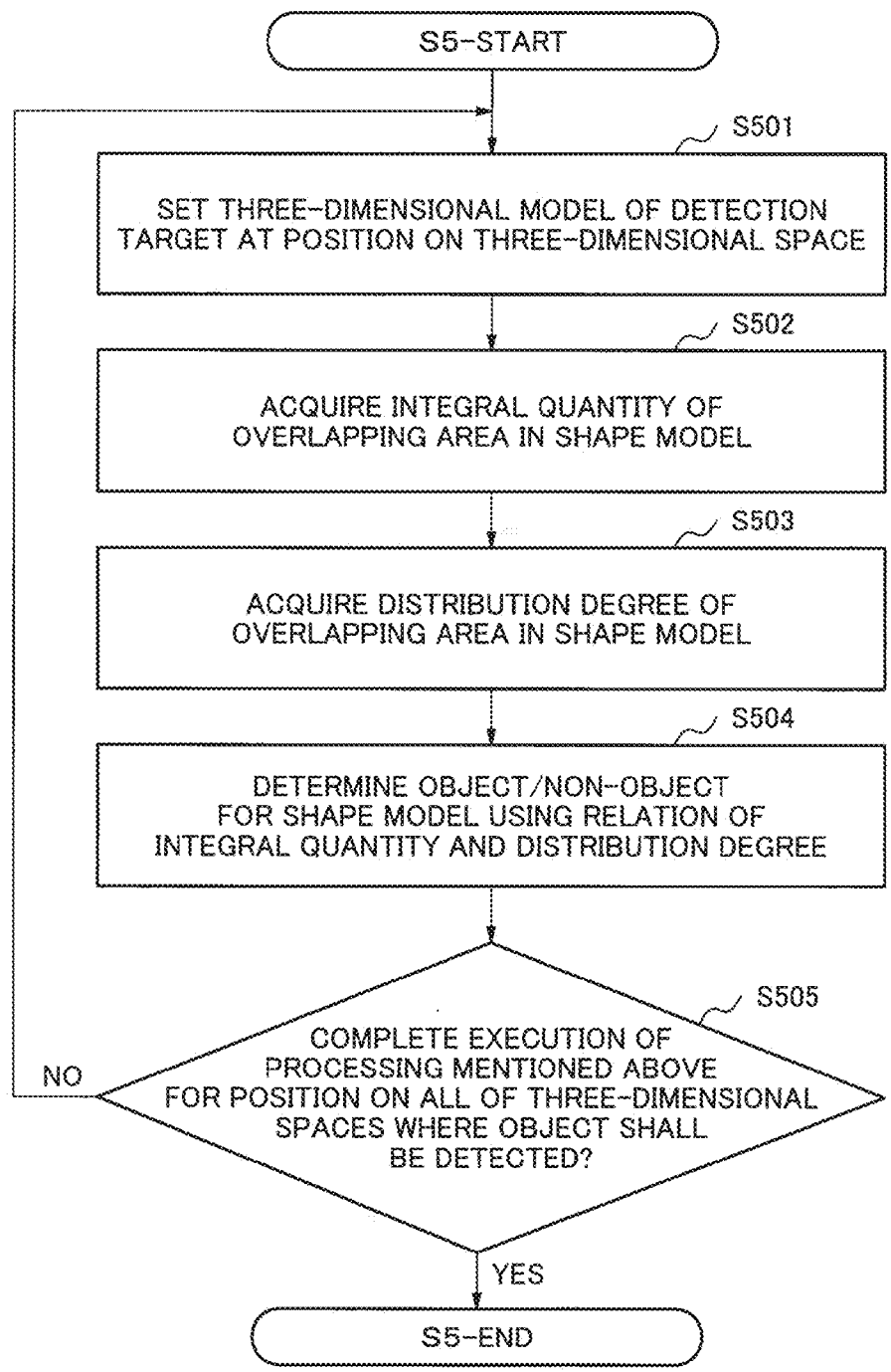
FIG. 7 is a flowchart diagram which illustrates an operation of the object detection unit 44 in Step S5 in detail.

FIG. 7 is a flowchart figure which describes the operation of the object detection unit 44 in Step S5 in detail. In order to perform the object detection, the object detection unit 44 sets the shape model of the detection target to the position on the three-dimensional space for performing the object detection as shown in FIG. 7 (Step S501).

The overlapping quantity acquisition unit 441 acquires the integral quantity of the overlapping area (the score in the three-dimensional space) in the shape model, by using the three-dimensional space data given the score indicating the data is of an overlapping area (the score in the three-dimensional space) and the shape model of the detection target which have been outputted from the area acquisition unit 43 (Step S502). The overlapping quantity acquisition unit 441 outputs the acquired integral quantity to the object determination unit 443.

The overlapping distribution acquisition unit 442 acquires the distribution degree that indicates whether the overlapping area (the score in the three-dimensional space) in the shape model is distributed uniformly or distributed unevenly, by using the three-dimensional space data given the score, which have been outputted from the area acquisition unit 43, indicating the overlapping area (the score in the three-dimensional space) and the shape model of the detection target (Step S503). The overlapping distribution acquisition unit 442 outputs the acquired distribution degree to the object determination unit 443. Because the processing of Step S502 and Step S503 are parallel, either step may be processed first.

The object determination unit 443 determines whether the internal of the shape model is an object or non-object, by using the integral quantity of the overlapping area which the overlapping quantity acquisition unit 441 has acquired and the distribution degree of the overlapping area which the overlapping distribution acquisition unit 442 has acquired (Step S504). In this case, the object determination unit 443 determines whether it is the object or non-object by the relation that the determination of an object is ruled by the integral quantity when the integral quantity (the population parameter of the overlapping area) is large or small extremely (the possibility of an object becomes higher when the integral quantity is larger) and the determination of an object is ruled by the distribution degree when the integral quantity has a certain volume (the possibility of an object becomes higher, the distribution degree become more uniform).

After the processing of Step S504 ends, the object detection unit 44 checks the completion of the processing of Steps S501 to S504 for the positions on the all three-dimensional spaces to perform the object detection (Step S505).

The object detection unit 44 repeats the processing of Steps S501 to S504 until the processing is completed in the positions on the all three-dimensional spaces to perform the object detection (Step S505—No). When the processing has completed to the position on the all three-dimensional spaces to perform object detection (step S505—Yes), the object detection unit 44 finishes the processing of Step S5 and outputs the detection result.

The operation of the object detection apparatus 100 will return to Step S1 after completing the processing of Step S5, and the object detection apparatus 100 becomes in a standby state until a synchronized image can be acquired.

Next, the effect of the object detection apparatus 100 according to the first exemplary embodiment of the present invention will be described.

The object detection apparatus 100 according to the first exemplary embodiment of the present invention determines whether the internal of the shape model is the object or non-object, by using the integral quantity and the distribution degree of the overlapping area in the shape model of the detection target in the overlapping area which indicates that the probability of an object on the three-dimensional space which is obtained from the object area in a plurality of camera images is high. Specifically, the object detection apparatus 100 determines whether the internal of the shape model is the object or non-object from the relation that the determination of the object is ruled by the integral quantity when the integral quantity (the population parameter of the overlapping area) is large or small extremely and the probability of an object is high and from the the relation that the determination of the object is ruled by the distribution degree and the probability of an object is high when the distribution degree is uniform when the integral quantity has a certain volume. Therefore, the object detection apparatus 100 can correctly distinguish the overlapping area of the object for which the determination of an object is difficult due to a lack of the extracted object area from a camera image and the overlapping area due to the noise or the like into the object and non-object. That is, the object detection apparatus 100 can reduce the influence caused by the precision decline (such as a lack of an object area) of the object area extraction from a camera image and detects an object on the three-dimensional space robustly.

Second Exemplary Embodiment

Next, the configuration of the object detection apparatus 200 according to the second exemplary embodiment of the present invention will be described, by using FIG. 8.

Figure 8:
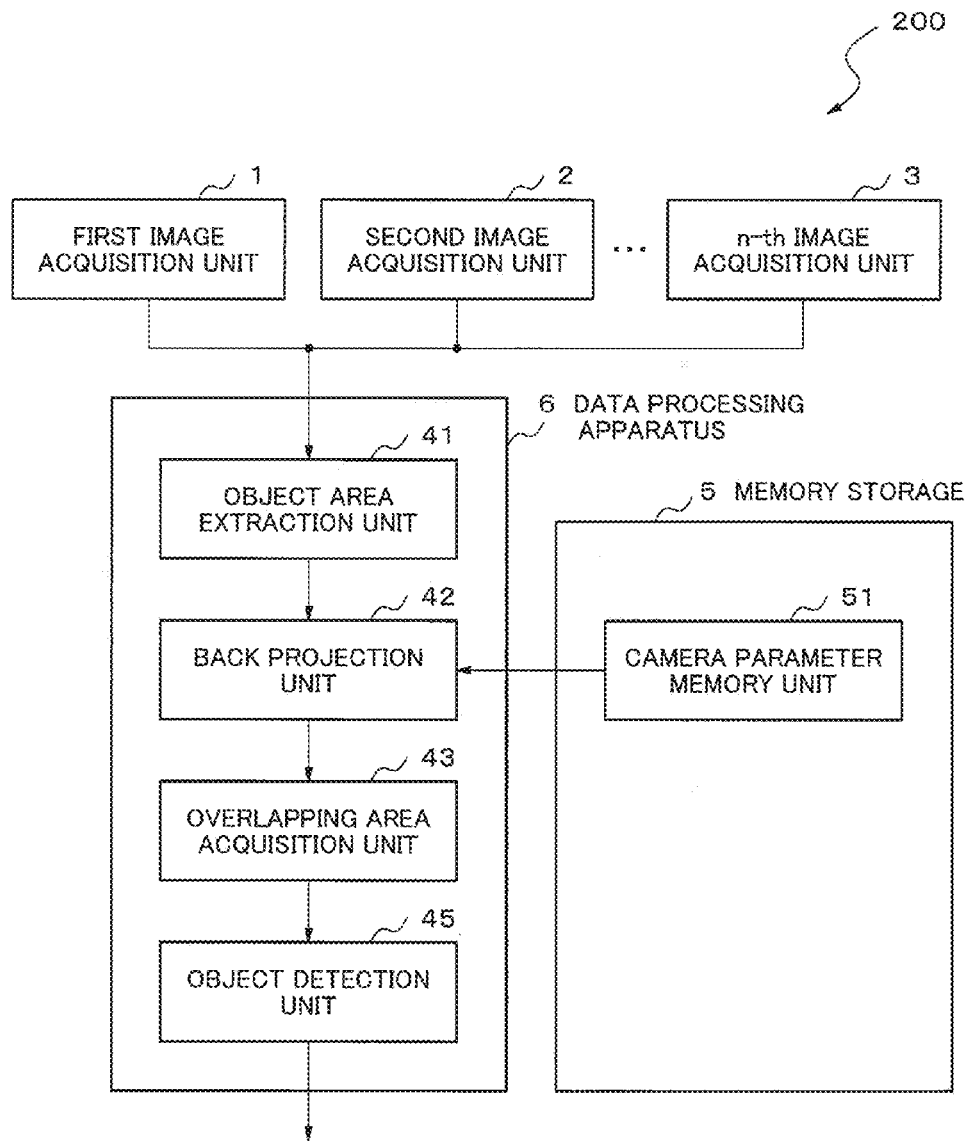
FIG. 8 is a block diagram which shows a composition of an object detection apparatus 200 according to a second exemplary embodiment of the present invention.

FIG. 8 is a block diagram which shows the composition of the object detection apparatus 200 according to the second exemplary embodiment of the present invention. Referring to FIG. 8, the object detection apparatus 200 according to the second exemplary embodiment of the present invention is different from the object detection apparatus 100 according to the first exemplary embodiment in the point (the point that a Data processing apparatus 4 is a Data processing apparatus 6) that an object detection unit 45 is included instead of the object detection unit 44. In terms with the other configurations since they are similar to the configuration in the object detection apparatus 100 according to the first exemplary embodiment, the same number is attached and the description is omitted.

In comparison with the object detection unit 44, the object detection unit 45 is different from the object detection unit 44 in the detailed composition.

Figure 9:
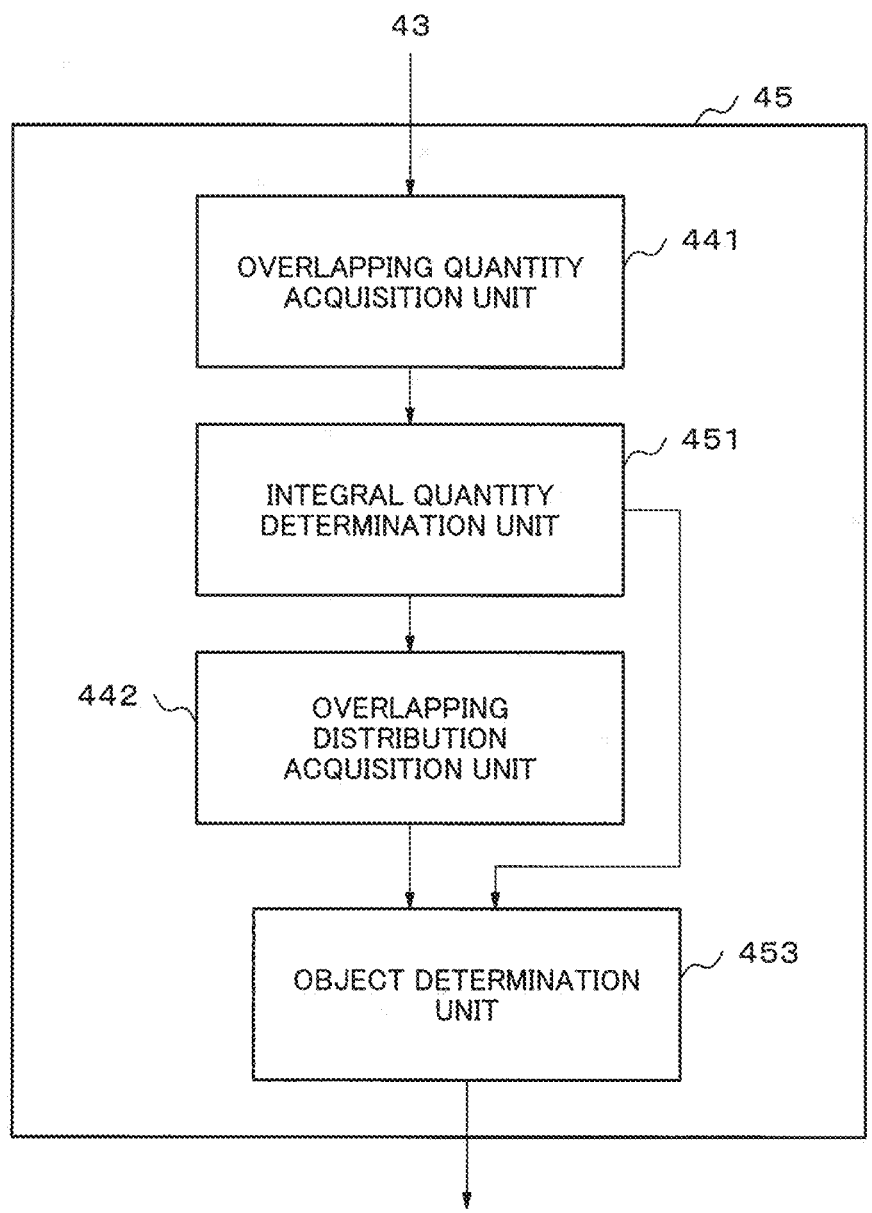
FIG. 9 is a block diagram which shows the detailed composition of the object detection unit 45.

FIG. 9 is a block diagram which shows the detailed composition of the object detection unit 45. The object detection unit 45 will be described with reference to FIG. 9. Then object detection unit 45 has a configuration that an integral quantity determination unit 451 is added to the object detection unit 44 in the first exemplary embodiment shown in FIG. 2 and FIG. 4. In addition, the object detection unit 45 has a configuration which has changed the arrangement of each composition unit from the arrangement of the object detection unit 44. Furthermore, the object detection unit 45 is different from then object detection unit 44 in a point that an object determination unit 453 is included instead of the object determination unit 443.

The integral quantity determination unit 451 acquires the integral quantity of the overlapping area from the overlapping quantity acquisition unit 441. The integral quantity determination unit 451 determines the degree of the volume in the integral quantity of the acquired overlapping area. As a result of the determination, when the integral quantity is large or small extremely, the integral quantity determination unit 451 outputs the integral quantity of the overlapping area outputted from the overlapping quantity acquisition unit 441 to the object determination unit 453. In this case, the overlapping distribution acquisition unit 442 is controlled so as not to carry out the processing to acquire the distribution degree.

In addition, when the integral quantity has a certain volume, the integral quantity determination unit 451 also outputs the integral quantity of the overlapping area outputted from the overlapping quantity acquisition unit 441 to the object determination unit 453. In this case, the overlapping distribution acquisition unit 442 is controlled so as to carry out the processing to acquire the distribution degree. Thus, the integral quantity determination unit 451 can reduce the useless processing by controlling a movement of the overlapping distribution acquisition unit 442 according to the integral quantity of the overlapping area.

Although the object determination unit 453 has the same configuration as the object determination unit 443 basically, it is different in a point that the method to determine an object under the predetermined condition is changed. The object determination unit 453 determines an object only by the integral quantity when the processing to acquire the distribution degree in the distribution acquisition unit 442 is not carried out by the integral quantity determination unit 451. The reason is because the integral quantity of the overlapping area is either of a extremely large value or a extremely small value when the processing to acquire the distribution degree in the distribution acquisition unit 442 is not carried out by the integral quantity determination unit 451. In addition, the object determination unit 453 determines an object only by the distribution degree since the integral quantity has a certain volume when the processing to acquire the distribution degree in the distribution acquisition unit 442 is carried out by the integral quantity determination unit 451.

Next, the operation of the object detection apparatus 200 according to the second exemplary embodiment of the present invention will be described in detail with reference to FIG. 7, FIG. 9 and FIG. 10.

Figure 10:
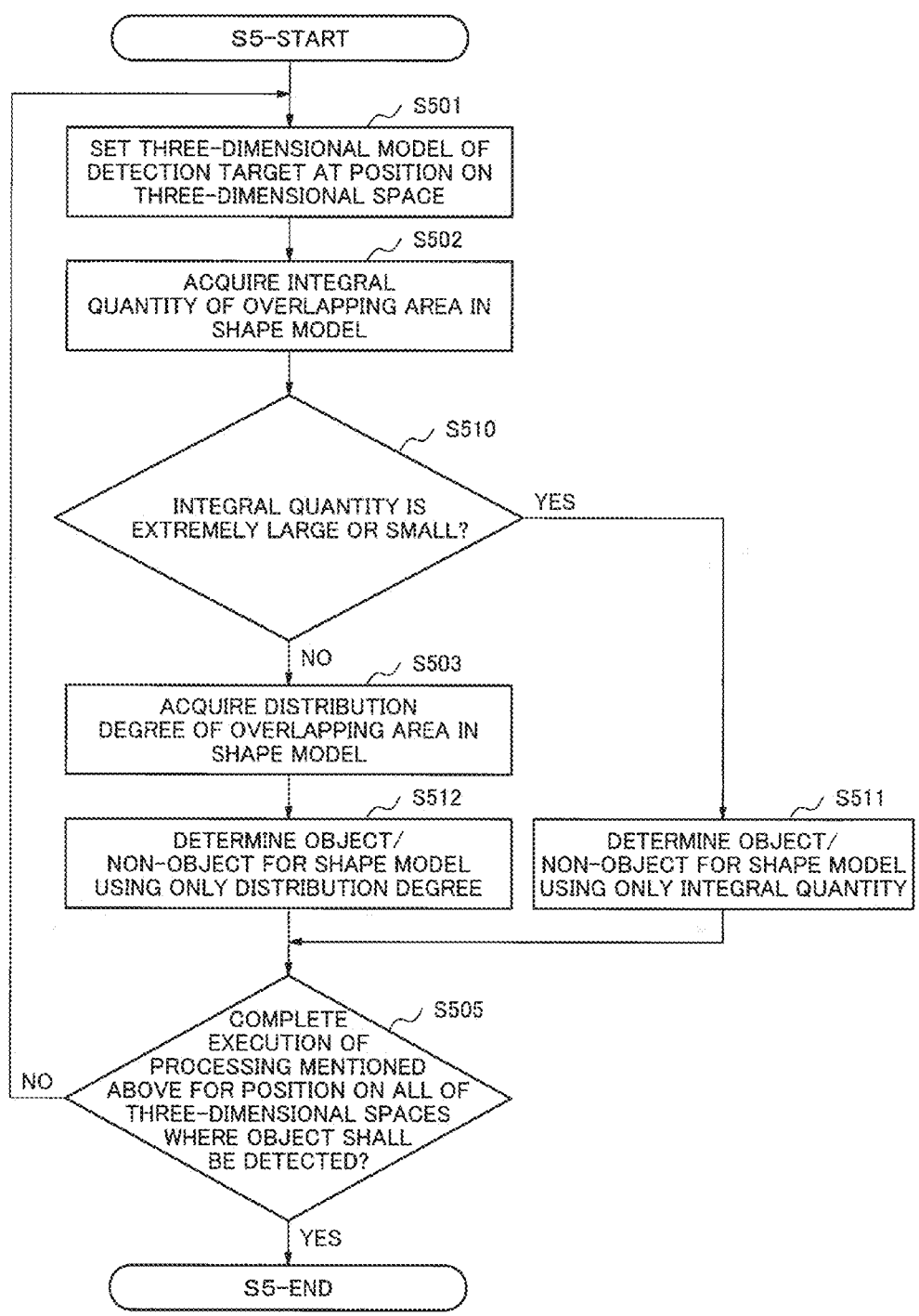
FIG. 10 is a flowchart diagram which describes an operation of the object detection unit 45 in detail.

FIG. 10 is a flowchart diagram which describes the operation of the object detection unit 45 in detail. As shown in FIG. 10, the operation of the object detection unit 45 is different in a point that the operation of Step S510, Step S511 and Step S512 is added newly except for the operation of Step S504 from the operation of the object detection unit 44 shown in FIG. 7. Because the other steps are same as the operation of the object detection unit 44 shown in FIG. 7, the description will be omitted.

The operation of Step S510, Step S511 and Step S512 shown in FIG. 10 will be described. The integral quantity determination unit 451 determines the degree of the volume in the integral quantity of the overlapping area obtained in the overlapping quantity acquisition unit 441 (Step S510).

As a result of the determination, when the integral quantity is large or small extremely (Step S510—Yes), the integral quantity determination unit 451 outputs the data of the integral quantity of the overlapping area to the object determination unit 453 and control not so as to carry out the processing to acquire the distribution degree in the distribution acquisition unit 442. The object determination unit 453 determines whether the internal of the shape mode is an object or non-object assuming that the possibility of the object is so high that the integral quantity of the area is large, based on the relation that the determination of an object is ruled by the integral quantity (Step S511).

As a result of the determination, when the integral quantity is large or small extremely (Step S510—No), the integral quantity determination unit 451 outputs the data of the integral quantity of the overlapping area to the object determination unit 453 and controls so as to carry out the processing to acquire the distribution degree in the distribution acquisition unit 442. The overlapping distribution acquisition unit 442 acquires the distribution degree of the area, by using the three-dimensional space data attached with the score (the score in the three-dimensional space) that indicates a overlapping area which has been outputted from the area acquisition unit 43 and the shape model (Step S503). The overlapping distribution acquisition unit 442 outputs the acquired distribution degree to the object determination unit 453.

The object determination unit 453 determines whether the internal of the shape mode is an object or non-object assuming that the probability that it is an object is high when the distribution degree of the overlapping area is uniform based on the relation that the determination of the object is ruled by the distribution degree of the overlapping area because the integral quantity of the overlapping area has a certain volume (Step S512).

Next, the effect of the object detection apparatus 200 according to the second exemplary embodiment of the present invention will be described.

In the object detection apparatus 200 according to the second exemplary embodiment of the present invention, the integral quantity determination unit 451 determines the degree of the volume in the integral quantity of the overlapping area before acquiring the distribution degree of the overlapping area. Because the determination of the object is carried out with omitting the acquisition processing of the distribution degree based on the determination when the integral quantity is large or small extremely, the calculation quantity can be reduced with maintaining the precision according to the object detection apparatus 200. In other words, according to the object detection apparatus 200, it is possible to speed up in the object detection on the three-dimensional space.

Third Exemplary Embodiment

Next, the configuration of the object detection apparatus 300 according to the third exemplary embodiment of the present invention will be described using FIG. 11.

Figure 11:
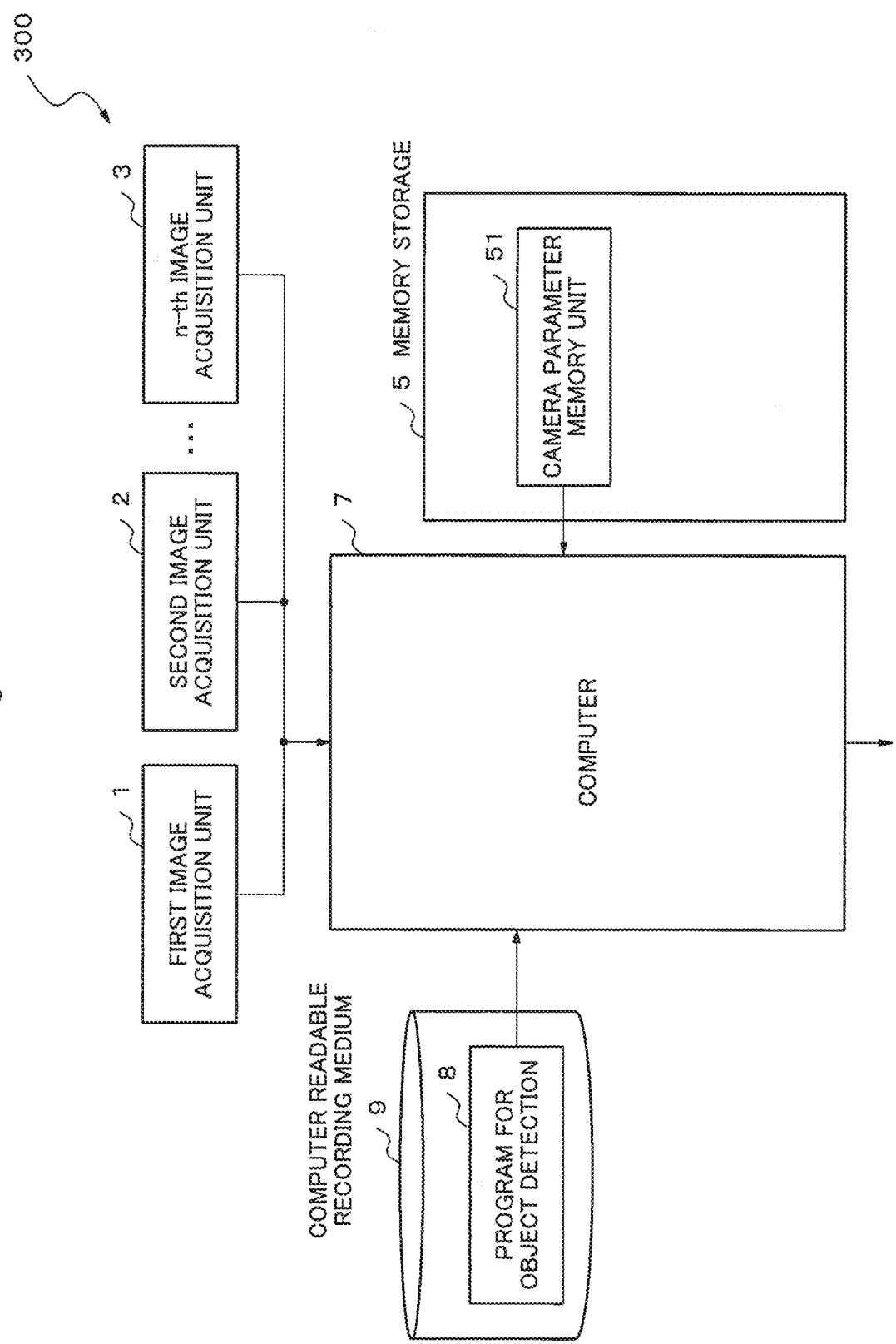
FIG. 11 is a block diagram which shows a composition of the object detection apparatus 300 according to a third exemplary embodiment of the present invention.

FIG. 11 is a block diagram which shows the composition of the object detection apparatus 300 according to the third exemplary embodiment of the present invention. Referring to FIG. 11, a memory storage 5 having the same first image acquiring unit 1 to n-th image acquiring unit 3 as the object detection apparatus 100 and a camera parameter memory unit 51 is connected to a computer 7 in the object detection apparatus 300 according to the third exemplary embodiment of the present invention. In addition, a computer readable storage medium 9 storing a program 8 for the object detection is connected to the computer 7.

The computer readable storage medium 9 includes a magnetic disk and a semiconductor memory or the like, and the program 8 for the object detection which is stored there is read by the computer 7 at the starting time and controls the operation of the computer 7. By the control, the program 8 for the object detection works the computer 7 as each of composition units 41 to 44 and 441 to 443 in the Data processing apparatus 4 in the first exemplary embodiment mentioned above and makes it carry out the processing shown in FIG. 6 and FIG. 7 is performed.

Although the object detection apparatus 100 according to the first exemplary embodiment has been realized by a computer and a program, this exemplary embodiment can also realize the object detection apparatus 200 according to the second exemplary embodiment using a computer and a program.

Fourth Exemplary Embodiment

Next, the configuration of the object detection apparatus 400 according to the fourth exemplary embodiment of the present invention will be described using FIG. 12.

Figure 12:
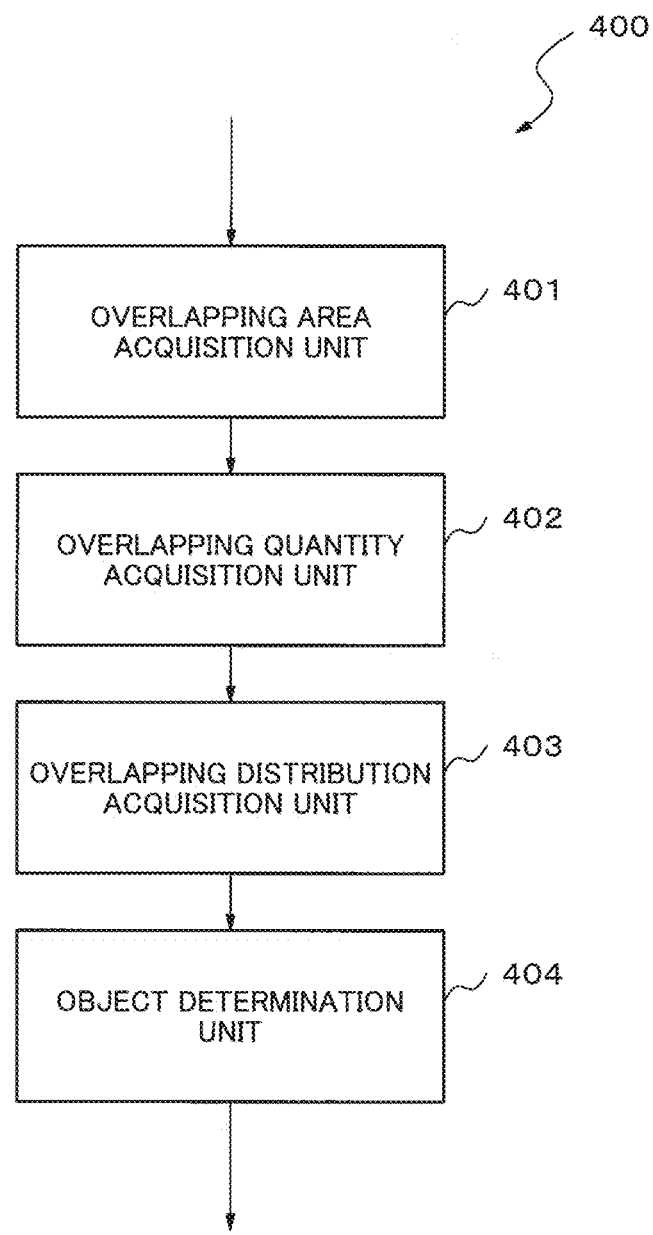
FIG. 12 is a block diagram which shows the composition of an object detection apparatus 400 according to a fourth exemplary embodiment of the present invention.

FIG. 12 is a block diagram which shows the composition of the object detection apparatus 400 according to the fourth exemplary embodiment of the present invention. Referring to FIG. 12, the object detection apparatus 400 according to the fourth exemplary embodiment of the present invention includes an overlapping area acquisition unit 401, an overlapping quantity acquisition unit 402, an overlapping distribution acquisition unit 403 and an object determination unit 404.

The overlapping area acquisition unit acquires the value of the overlapping area which indicates that the possibility that it is an object on the three-dimensional space is high using the data to which the back projection has been performed for the object area which has been generated by the images which a plurality of image acquiring units have acquired on the three-dimensional space.

The overlapping quantity acquisition unit acquires the integral quantity of the value of the overlapping area in the shape model of a detection target.

The overlapping distribution acquisition unit acquires the distribution degree of the value of the overlapping area in the shape model of a detection target.

The object determination unit determines whether the internal of the shape model of the detection target is an object or non-object using the integral quantity and the distribution degree.

According to the object detection apparatus 400, it is enabled to reduce the influence caused by the precision decline (such as the lack of the object area) of the object area extraction from a camera image and detect an object on the three-dimensional space robustly.

Other Expressions of an Exemplary Embodiment

In each embodiment mentioned above, the characteristic compositions of the object detection apparatus, the object detection method and the program as shown below are indicated (they are not limited as follows). Further, the attribute selection program of the present invention may be a program which makes a computer execute each operation described in the embodiment mentioned above. In addition, the object detection apparatus of the present invention may be realized by CPU executing a program recorded in a recording medium such as HDD and a memory.

(Supplementary Note 1)

An object detection apparatus which includes an overlapping area acquisition unit that acquires the value of the overlapping area which indicates that a possibility of the object on the three-dimensional space is high using the data to which has been performed a back projection of an object area which has been generated by an image which a plurality of image acquiring units have acquired on a three-dimensional space, an overlapping quantity acquisition unit which acquires the integral quantity of the value of the overlapping area in the shape model which is a three-dimensional model concerning to the shape of the object of the detection target, an overlapping distribution acquisition unit which acquires the distribution degree of the value of the overlapping area in the shape model of the detection target and an object determination unit which determines whether the internal of the shape model of a detection target is an object or non-object using the integral quantity and the distribution degree.

(Supplementary Note 2)

An object detection apparatus according to Addition 1, in which the object determination unit determines that the possibility that the internal of the shape model is an object is high when the integral quantity is large in case that the integral quantity is large enough to determine whether the internal of the shape model is an object or not by the integral quantity being large or small extremely and determine that the internal of the shape model is an object is high when the distribution degree is uniform in case that the integral quantity is not large enough to determine whether the internal of the shape model is an object or not, using the integral quantity and the distribution degree in the shape model of the detection target.

(Supplementary Note 3)

An object detection apparatus according to Addition 2, in which the object determination unit determines that the internal of the shape model is an object in case that the integral quantity of the values of the overlapping area is not smaller than the first threshold value which is the value enough to determine that the internal of the shape model is an object by the integral quantity, determines that the internal of the shape model is non-object in case that the integral quantity of the values of the overlapping area is not larger than the second threshold value which is the value enough to determine that the internal of the shape model is non-object by the integral quantity, determines that the internal of the shape model is an object in case that the distribution degree of the overlapping area is not larger than the third threshold value which indicates that the distribution degree of the overlapping area is uniform (nearly uniform) when the integral quantity of the value of the overlapping area is smaller than the first threshold value and larger than the second threshold value, and determines that the internal of the shape model is non-object in case that the distribution degree of the values of the overlapping area is not smaller than the third threshold value (nearly uneven), in the shape model of the detection target.

(Supplementary Note 4)

An object detection apparatus according to any one of Additions 1 to 3, in which the object determination unit performs the larger weighting for the integral quantity when the distribution degree of the data of the overlapping area becomes closer to the uniformity in case that the integral quantity of the value of the overlapping area is smaller than the first threshold value and larger than the second threshold value, and determines whether the internal of the shape model is an object or non-object assuming that the possibility of a object is large when the integral quantity is larger.

(Supplementary Note 5)

An object detection apparatus according to any one of Additions 1 to 4, in which the object determination unit integrates the first likelihood function which becomes closer to 1 when the integral quantity of the data of the overlapping area is larger and the second likelihood function which becomes closer to 1 when the distribution degree of the overlapping area becomes more uniform by the sum which is weighted so that the first likelihood function may be weighted in case that the integral quantity is not smaller than the first threshold value or not larger than the second threshold value.

(Supplementary Note 6)

An object detection apparatus according to any one of Additions 1 to 5 in which, the overlapping distribution acquisition unit calculates the integral quantity of the values of the overlapping area from a plurality of the respective partial spaces of the shape model of the detection target and acquires the dispersion that is calculated from the normalized values by the integral quantity of the values of the overlapping area in the whole shape model.

(Supplementary Note 7)

An object detection apparatus according to any one of Additions 1 to 6 in which, the overlapping distribution acquisition unit divides into in the height direction equally and sets the partial spaces to a plurality of the partial spaces of the shape model of the required detection target when the distribution degree is calculated.

(Supplementary Note 8)

An object detection apparatus according to any of additions 1 to 7 in which, the overlapping area acquisition unit determines the presence of the back projection out of the image acquiring units from which the sight is obtained by the value of 1 or 0, and they are the respective values in the a plurality of image acquiring units, and, the value is acquired as the value of the overlapping area which shows that is high.

(Supplementary Note 9)

An object detection apparatus according to any of additions 1 to 8 in which, the overlapping area acquisition unit acquires the value that is obtained with the normalization of the number of the image acquiring units from which the back projection is obtained by the number of the image acquiring units from which the sight is obtained as the value of the overlapping area which indicates the possibility of an object is high.

(Supplementary Note 10)

An object detection apparatus according to any one of Additions 1 to 9, which includes a camera parameter memory unit that stores a camera parameter, an object area extraction unit that acquires an image synchronized from the a plurality of image acquiring units and generates an object area image to which the value that indicates an object area extracted from each image has been attached.

a back projection unit that performs a back projection of the object area in the object area image on the three-dimensional space and outputs the data which has performed the back projection on the three-dimensional space to the overlapping area acquisition using the camera parameter.

(Supplementary Note 11)

An object detection apparatus according to addition 9 in which, the object area extraction unit extracts the object area by performing a background difference method, an inter-frame difference method or an object detection method using a posterior probability.

(Supplementary Note 12)

An object detection method in which, an overlapping area acquisition unit acquires the value of the overlapping area which indicates that a possibility of the object on the three-dimensional space is high using the data to which has been performed a back projection of an object area which has been generated by an image which a plurality of image acquiring units have acquired on a three-dimensional space, an overlapping quantity acquisition unit acquires the integral quantity of the value of the overlapping area in the shape model which is a three-dimensional model concerning to the shape of the object of the detection target, an overlapping distribution acquisition unit acquires the distribution degree of the value of the overlapping area in the shape model of the detection target and an object determination unit determines whether the internal of the shape model of a detection target is an object or non-object using the integral quantity and the distribution degree.

(Supplementary Note 13)

An object detection apparatus method to addition 12, in which the object determination unit determines that the internal of the shape model is an object in case that the integral quantity of the values of the overlapping area is not smaller than the first threshold value which is the value enough to determine that the internal of the shape model is an object by the integral quantity, determines that the internal of the shape model is non-object in case that the integral quantity of the values of the overlapping area is not larger than the second threshold value which is the value enough to determine that the internal of the shape model is non-object by the integral quantity, determines that the internal of the shape model is an object in case that the distribution degree of the overlapping area is not larger than the third threshold value which indicates that the distribution degree of the overlapping area is uniform when the integral quantity of the value of the overlapping area is smaller than the first threshold value and larger than the second threshold value, and determines that the internal of the shape model is non-object in case that the distribution degree of the values of the overlapping area is not smaller than the third threshold value, in the shape model of the detection target.

(Supplementary Note 14)

A program which makes a computer execute the processing to acquire the value of the overlapping area which indicates that a possibility of the object on the three-dimensional space is high using the data to which has been performed a back projection of an object area which has been generated by an image which a plurality of image acquiring units have acquired on a three-dimensional space, acquire the integral quantity of the value of the overlapping area in the shape model which is a three-dimensional model concerning to the shape of the object of the detection target, acquire the distribution degree of the value of the overlapping area in the shape model of the detection target and determine whether the internal of the shape model of a detection target is an object or non-object using the integral quantity and the distribution degree.

(Supplementary Note 15)

A program according to addition 14, executes the determination by determining that the internal of the shape model is an object in case that the integral quantity of the values of the overlapping area is not smaller than the first threshold value which is the value enough to determine that the internal of the shape model is an object by the integral quantity, determining that the internal of the shape model is non-object in case that the integral quantity of the values of the overlapping area is not larger than the second threshold value which is the value enough to determine that the internal of the shape model is non-object by the integral quantity, determining that the internal of the shape model is an object in case that the distribution degree of the overlapping area is not larger than the third threshold value which indicates that the distribution degree of the overlapping area is uniform when the integral quantity of the value of the overlapping area is smaller than the first threshold value and larger than the second threshold value, and determining that the internal of the shape model is non-object in case that the distribution degree of the values of the overlapping area is not smaller than the third threshold value, in the shape model of the detection target.

This application insists on the priority which makes the Japanese Patent Application No. 2011-147289 proposed on Jul. 1, 2011 a basic application and takes everything of the disclosure here.

Although the present invention has been described with reference to the exemplary embodiment in this way, the present invention is not limited to the above-mentioned exemplary embodiment. The composition of the present invention and its details can be modified with various changes which a person skilled in the art can understand in the scope of the present invention.

INDUSTRIAL APPLICABILITY

When an object on the three-dimensional space is detected using a back projection of an object area extracted from a plurality of camera images, the present invention can be applied to an object detection apparatus which can reduce the influence by a precision decline (such as a lack of an object area) of the object area extraction from a camera image and detect an object robustly. The present invention can be applied to the usage such as a programs for realizing the object detection apparatus in a computer. The present invention can be also applied to the usage such as the apparatus or the functions which perform a intruder detection, a suspicious person detection, a left suspicious object detection, a carrying detection for baggage, an accompany detection for gate passing, a congestion and line detection in the surveillance field which requires the object detection on the three-dimensional space from a camera and a stored video.

In addition, the present invention can be applied to the usage such as the apparatus or the functions which perform a line of flow analysis and a behavior analysis in the marketing field. Furthermore, the present invention can be applied to the usage such as the input interfaces which inputs an object detection and an object position from a camera or a stored video. Additionally, it can be applied to the usage such as the video/image search apparatus and the functions which include an object detection or an object position as a trigger or a key.

REFERENCE SIGNS LIST

1 First image acquiring unit.
2 Second image acquiring unit.
3 n-th image acquiring unit.
4 Data processing apparatus
5 Memory storage.
7 Computer.
8 Program for object detection.
9 Computer readable storage medium.
41 Object area extraction unit.
42 Back projection unit
43 Overlapping area acquisition unit.
44, 45 Object detection unit.
51 Camera parameter memory unit.
100, 200, 300, 400 Object detection apparatus.
441 Overlapping quantity acquisition unit.
442 Overlapping distribution acquisition unit.
443, 453 Object determination unit
451 Integral quantity determination unit.

The invention claimed is:

1. An object detection apparatus, comprising:
an overlapping area acquisition unit which acquires an overlapping area indicating that a potential object exists in a three-dimensional space based on data generated by images acquired by a plurality of image acquiring units, wherein the data corresponds to an object area in the three-dimensional space;
an overlapping quantity acquisition unit which acquires an integral quantity of a shape model related to the overlapping area, wherein the shape model comprises a three-dimensional model corresponding to a shape of the potential object, and wherein the integral quantity is a value representing a degree to which the potential object fills the shape model;
an overlapping distribution acquisition unit which acquires a distribution degree of the shape model related to the overlapping area, wherein the distribution degree is a value representing a degree to which the potential object is uniformly distributed in the shape model; and
an object determination unit which determines whether the potential object is an object,
wherein when the integral quantity is higher in value than a first threshold value, or lower in value than a second threshold value, the object determination unit determines whether the potential object is an object based on the integral quantity, and
wherein when the integral quantity is lower in value than the first threshold value and higher in value than the second threshold value, the object determination unit determines whether the potential object is an object based on the distribution degree.

2. The object detection apparatus according to claim 1, wherein the object determination unit:
determines that the potential object corresponds to an object when the integral quantity is higher in value than the first threshold value;
determines that the potential object does not correspond to an object when the integral quantity is lower in value than the second threshold value; and
determines that the potential object corresponds to an object when the distribution degree is lower in value than a third threshold value.

3. The object detection apparatus according to claim 2, wherein the object determination unit:
determines that the potential object corresponds to an object when the integral quantity is lower in value than the first threshold value and higher in value than the second threshold value, and when the distribution degree is lower in value than a third threshold value, and
determines that the potential object does not correspond to an object when the integral quantity is lower in value than the first threshold value and higher in value than the second threshold value, and when the distribution degree is higher in value than the third threshold value.

4. The object detection apparatus according to claim 1, wherein, in determining the distribution degree, the overlapping quantity acquisition unit:
divides the shape model into a plurality of partial spaces, each partial space corresponding to a portion of the overlapping area;
calculates an integral quantity for each of the plurality of partial spaces based on the corresponding portion of the overlapping area; and
acquires a dispersion calculated from normalized values of the integral quantities.

5. The object detection apparatus according to claim 4 in which the overlapping quantity acquisition unit divides the shape model into equally sized partial spaces to calculate the distribution degree in a height direction of the shape model.

6. The object detection apparatus according to claim 1, further comprising:
a camera parameter memory unit that stores a camera parameter;
an object area extraction unit which acquires an image synchronized from the plurality of image acquiring units and generates the object area having the corresponding data; and
a back projection unit which performs a back projection of the object area on the three-dimensional space using the camera parameter and outputs corresponding back projection data to the overlapping area acquisition unit.

7. An object detection method, comprising:
acquiring an overlapping area which indicates that a potential object exists in a three-dimensional space based on data generated by images acquired by a plurality of image acquiring units, wherein the data corresponds to an object area in the three-dimensional space;
acquiring an integral quantity of a shape model related to the overlapping area, wherein the shape model comprises a three-dimensional model corresponding to a shape of the potential object, and wherein the integral quantity is a value representing a degree to which the potential object fills the shape model;
acquiring a distribution degree of the shape model related to the overlapping area, wherein the distribution degree is a value representing a degree to which the potential object is uniformly distributed in the shape model; and
determining whether the potential object is an object,
wherein when the integral quantity is higher in value than a first threshold value, or lower in value in than a second threshold value, the determination of whether the potential object is an object is made based on the integral quantity, and wherein when the integral quantity is lower in value than the first threshold value and higher in value than the second threshold value, the determination of whether the potential object is an object is made based on the distribution degree.

8. A non-transitory computer readable medium storing a computer program for object detection causing a computer to execute software to perform the functions of:

acquiring an overlapping area which indicates that a potential object exists in a three-dimensional space based on data generated by images acquired by a plurality of image acquiring units, wherein the data corresponds to an object area in the three-dimensional space;

acquiring an integral quantity of a shape model related to the overlapping area, wherein the shape model comprises a three-dimensional model corresponding to a shape of the potential object, and wherein the integral quantity is a value representing a degree to which the potential object fills the shape model;

acquiring a distribution degree of the overlapping area in the shape model related to the overlapping area, wherein the distribution degree is a value representing a degree to which the potential object is uniformly distributed in the shape model; and determining whether the potential object is an object, wherein when the integral quantity is higher in value than a first threshold value, or lower in value than a second threshold value, the determination of whether the potential object is an object is made based on the integral quantity, and wherein when the integral quantity is lower in value than the first threshold value and higher in value than the second threshold value, the determination of whether the potential object is an object is made based on the distribution degree.

9. The object detection apparatus according to claim 2, wherein, in determining the distribution degree, the overlapping quantity acquisition unit:

divides the shape model into a plurality of partial spaces, each partial space corresponding to a portion of the overlapping area;

calculates an integral quantity for each of the plurality of partial spaces based on the corresponding portion of the overlapping area; and acquires a dispersion calculated from normalized values of the integral quantities.

10. The object detection apparatus according to claim 3, wherein the overlapping quantity acquisition unit:

divides the shape model into a plurality of partial spaces, each partial space corresponding to a portion of the overlapping area;

calculates an integral quantity for each of the plurality of partial spaces based on the corresponding portion of the overlapping area; and acquires a dispersion calculated from normalized values of the integral quantities.

11. The object detection apparatus according to claim 10 in which the overlapping quantity acquisition unit divides the shape model into equally sized partial spaces to calculate the distribution degree in a height direction of the shape model.

12. The object detection method according to claim 11 in which the overlapping quantity acquisition unit divides the shape model into equally sized partial spaces to calculate the distribution degree in a height direction of the shape model.

13. The object detection apparatus according to claim 2 further comprising:

a camera parameter memory unit that stores a camera parameter;

an object area extraction unit which acquires an image synchronized from the plurality of image acquiring units and generates the object area having the corresponding data; and a back projection unit which performs a back projection of the object area on the three-dimensional space using the camera parameter and outputs corresponding back projection data to the overlapping area acquisition unit.

14. The object detection apparatus according to claim 3 further comprising:

a camera parameter memory unit that stores a camera parameter;

an object area extraction unit which acquires an image synchronized from the plurality of image acquiring units and generates the object area having the corresponding data; and a back projection unit which performs a back projection of the object area on the three-dimensional space using the camera parameter and outputs corresponding back projection data to the overlapping area acquisition unit.

15. An object detection apparatus, comprising:

an interface that receives data corresponding to images; and processing circuitry configured to:

acquire an overlapping area indicating that a potential object exists in a three-dimensional space based on the data corresponding to the images, wherein the data corresponds to an object area in the three-dimensional space;

acquire an integral quantity of a shape model related to the overlapping area, wherein the shape model comprises a three-dimensional model corresponding to a shape of the potential object, and wherein the integral quantity is a value representing a degree to which the potential object fills the shape model;

acquire a distribution degree of the shape model related to the overlapping area, wherein the distribution degree is a value representing a degree to which the potential object is uniformly distributed in the shape model; and determine whether the potential object is an object, wherein when the integral quantity is higher in value than a first threshold value, or lower in value than a second threshold value, the processing circuitry determines whether the potential object is an object based on the integral quantity, and wherein when the integral quantity is lower in value than the first threshold value and higher in value than the second threshold value, the processing circuitry determines whether the potential object is an object based on the distribution degree.

16. The object detection apparatus according to claim 15, wherein the processing circuitry is further configured to:

determine that the potential object corresponds to an object when the integral quantity is higher in value than the first threshold value;

determine that the potential object does not correspond to an object when the integral quantity is lower in value than the second threshold value; and determine that the potential object corresponds to an object when the distribution degree is lower in value than a third threshold value.

17. The object detection apparatus according to claim 16, wherein the processing circuitry is further configured to:
   determine that the potential object corresponds to an object when the integral quantity is lower in value than the first threshold value and higher in value than the second threshold value, and when the distribution degree is lower in value than the third threshold value, and
   determine that the potential object does not correspond to an object when the integral quantity is lower in value than the first threshold value and higher in value than the second threshold value, and when the distribution degree is higher in value than the third threshold value.

* * * * *